US010731759B2

(12) United States Patent
Svrcek et al.

(10) Patent No.: US 10,731,759 B2
(45) Date of Patent: Aug. 4, 2020

(54) REINFORCED SEALING RINGS

(71) Applicant: EtaGen, Inc., Menlo Park, CA (US)

(72) Inventors: Matt Svrcek, Redwood City, CA (US); Jodie Prudhomme, San Francisco, CA (US); Jerry DeJong, Union City, CA (US); Tom Hasler, Woodside, CA (US)

(73) Assignee: Mainspring Energy, Inc., Menlo Park, CA (US)

( * ) Notice: Subject to any disclaimer, the term of this patent is extended or adjusted under 35 U.S.C. 154(b) by 0 days.

(21) Appl. No.: 16/059,933

(22) Filed: Aug. 9, 2018

(65) Prior Publication Data
US 2019/0049012 A1 Feb. 14, 2019

Related U.S. Application Data

(60) Provisional application No. 62/543,282, filed on Aug. 9, 2017, provisional application No. 62/543,285, filed on Aug. 9, 2017.

(51) Int. Cl.
*F16J 9/28* (2006.01)
*F16J 15/44* (2006.01)
(Continued)

(52) U.S. Cl.
CPC ............... *F16J 9/28* (2013.01); *F02G 1/0535* (2013.01); *F16J 9/16* (2013.01); *F16J 15/164* (2013.01);
(Continued)

(58) Field of Classification Search
CPC ..... F16J 9/28; F16J 15/34; F16J 9/063; F02G 2253/02
See application file for complete search history.

(56) References Cited

U.S. PATENT DOCUMENTS

| RE20,256 E | * | 1/1937 | Wuerfel | F16J 9/063 |
| | | | | 277/457 |
| 2,293,450 A | * | 8/1942 | Wilkening | F16J 9/063 |
| | | | | 267/1.5 |

(Continued)

FOREIGN PATENT DOCUMENTS

| DE | 2404228 | 8/1975 |
| DE | 102012019166 | 4/2014 |

OTHER PUBLICATIONS

International Search Report dated Nov. 7, 2018 for Application No. PCT/US2018/046105.

*Primary Examiner* — Eugene G Byrd
(74) *Attorney, Agent, or Firm* — Haley Guiliano LLP

(57) ABSTRACT

The present disclosure provides a sealing ring assembly having a sealing ring and a reinforcement, configured to seal a high-pressure region from a lower pressure region of a piston and cylinder device. The sealing ring may be segmented, and a metal layer, wire, or other reinforcement may be affixed to the ring. The reinforcement is placed into tension against the sealing ring, which is correspondingly placed into compression. The composite structure of a relatively brittle sealing ring and reinforcement provides for reduced tensile loads in the sealing ring, thus extending life and reducing the likelihood of failure. The brittle portion of the sealing ring assembly may include a polymer or ceramic such as graphite, which is relatively less strong in tension than compression.

30 Claims, 6 Drawing Sheets

(51) Int. Cl.
*F16J 15/16* (2006.01)
*F02G 1/053* (2006.01)
*F16J 9/16* (2006.01)
*F16J 15/34* (2006.01)

(52) U.S. Cl.
CPC .............. *F16J 15/34* (2013.01); *F16J 15/442* (2013.01); *F02G 2253/02* (2013.01)

(56) References Cited

U.S. PATENT DOCUMENTS

| | | | | |
|---|---|---|---|---|
| 2,468,980 A * | 5/1949 | Huber | ............... | F16J 9/06 92/182 |
| 2,779,646 A * | 1/1957 | Creed | ............... | F16J 9/28 277/454 |
| 2,823,086 A * | 2/1958 | Zahodiakin | ............... | F16J 9/063 277/479 |
| 2,898,134 A * | 8/1959 | Moskow | ............... | F16J 15/32 277/467 |
| 3,099,455 A * | 7/1963 | Mayfield | ............... | F16J 9/062 277/481 |
| 3,455,565 A * | 7/1969 | Jepsen | ............... | F16J 9/28 277/467 |
| 3,612,538 A * | 10/1971 | Sievenpiper | ............... | F16J 9/06 277/468 |
| 3,655,208 A * | 4/1972 | Walker | ............... | F16J 9/28 277/496 |
| 4,185,842 A | 1/1980 | Magara | | |
| 4,455,974 A | 6/1984 | Shapiro et al. | | |
| 4,516,481 A * | 5/1985 | Geffroy | ............... | F16J 9/16 123/193.6 |
| 5,014,999 A | 5/1991 | Makhobey | | |
| 6,322,080 B1 * | 11/2001 | Feistel | ............... | F16J 9/16 277/435 |
| 6,378,872 B1 * | 4/2002 | Moriarty | ............... | F16J 9/16 277/310 |
| 6,457,722 B1 | 10/2002 | Feistel | | |
| 7,634,963 B2 * | 12/2009 | Maier | ............... | C09D 171/10 92/212 |
| 8,177,237 B2 * | 5/2012 | Lindner-Silwester | ..... | F16J 9/14 277/435 |
| 8,807,571 B2 * | 8/2014 | Chalk | ............... | F16J 9/12 277/490 |
| 2003/0006562 A1 | 1/2003 | Feistel | | |
| 2007/0125323 A1 * | 6/2007 | Hofbauer | ............... | F16J 9/02 123/73 R |

* cited by examiner

REINFORCED SEALING RINGS

The present disclosure is directed towards a piston sealing ring assembly and, more particularly, the present disclosure is directed towards a piston sealing ring assembly that includes a sealing ring with reinforcement. This application claims the benefit of U.S. Provisional Patent Application Nos. 62/543,282 and 62/543,285 both filed Aug. 9, 2017, the disclosures of which are hereby incorporated by reference herein in their entirety.

BACKGROUND

Typically, piston-cylinder devices employ metal rings with oil lubrication to provide a seal. In the absence of lubricating oil, a piston seal can be constructed from a self-lubricating material such as a polymer or ceramic (e.g., graphite). Use of a self-lubricating material for the seal eliminates scuffing or galling caused by an unlubricated metal ring but can result in a relatively high wear rate as compared to a conventional oil-lubricated seal arrangement.

For economic reasons, it is desirable for the seal to function for as long as possible before needing replacement. For example, a typical target might be hundreds or thousands of hours of operation. Throughout this lifetime the seal wears down radially. To compensate for this wear, the seal is typically split in one or more places, allowing pressure to expand the ring outward and maintain sealing contact with the cylinder wall in spite of the material removed via wear.

As the seal wears, it stretches to conform to the cylinder during, for example, a piston stroke. This stretch results in increasing levels of tensile stress in the seal, with the highest stretch-induced tensile stresses typically arising at the inner diameter (ID) of the ring or ring segment. For materials that are weak in tension (i.e., brittle) this can be a life-limiting phenomenon wherein the seal is capable of only a finite amount of stretch (and in turn a finite amount of radial wear) before tensile stresses cause it to fracture.

SUMMARY

In some embodiments, a sealing ring assembly includes at least one ring segment, and at least one reinforcement affixed to the at least one ceramic ring segment at an interface. The reinforcement provides a compressive preload onto the at least one ring segment.

In some embodiments, the interface is a brazed joint. In some embodiments, the reinforcement includes a metal layer, which includes at least one metal sheet.

In some embodiments, at least one of the at least one ring segment includes a ceramic or a polymer. In some embodiments, at least one of the at least one ring segment includes a self-lubricating material. For example, in some embodiments, the self-lubricating material includes graphite.

In some embodiments, the at least one ring segment has a corresponding first coefficient of thermal expansion (CTE), the reinforcement has a corresponding second CTE, and the first CTE and the second CTE are matched to each other. For example, in some embodiments, the first CTE and the second CTE are substantially similar. In some embodiments, for example, the first CTE and second CTE need not be matched.

In some embodiments, the reinforcement is affixed along a portion of the at least one ceramic ring segment. In some embodiments, the reinforcement is affixed along an inner radial surface of the at least one ring segment.

In some embodiments, as the at least one ring segment wears, the at least one ring segment remains in compression, and the at least one reinforcement remains in tension, for at least some time during operation. For example, in some embodiments, during high-pressure periods of a stroke or cycle of a piston and cylinder device, the at least one ring segment remains in compression, and the at least one reinforcement remains in tension.

In some embodiments, the present disclosure is directed to a device that includes a cylinder, a piston, and a sealing ring assembly. The cylinder includes a bore, and the bore in turn includes a low-pressure region and a high-pressure region. The piston comprises a ring groove, and the piston is configured to translate along an axis of the bore. The sealing ring assembly is arranged in the ring groove. The sealing ring assembly includes at least one ring segment configured to seal between the low-pressure region and the high-pressure region, and at least one reinforcement affixed to the at least one ring segment at an interface. The reinforcement provides a compressive preload onto the at least one ring segment, for at least some of a stroke. In some embodiments, the sealing ring assembly is configured for oil-less operation in the bore.

In some embodiments, the present disclosure is directed to a sealing ring assembly that includes at least one ring segment, and at least one wire engaged with the at least one ring segment causing the at least one ring segment to be in compression and the at least one wire to be in tension, for at least some of the stroke (e.g., at least some of every stroke).

In some embodiments, the wire comprises metal.

In some embodiments, the at least one wire is engaged to the at least one ring segment at an interface. In some embodiments, the at least one wire is engaged to the at least one ring segment using a tensioning termination. In some embodiments, the at least one wire azimuthally extends through the at least one ring segment.

In some embodiments, the at least one wire includes at least one threaded end, the tensioning termination includes a thread corresponding to the threaded end, and the tensioning termination is threaded onto the threaded end to cause the engaging. In some embodiments, the tensioning termination is torqued onto the threaded end.

In some embodiments, the present disclosure is directed to a device that includes a cylinder, a piston, and a sealing ring assembly. The cylinder includes a bore, and the bore in turn includes a low-pressure region and a high-pressure region. The piston includes a ring groove, and the piston is configured to translate along an axis of the bore. The sealing ring assembly is arranged in the ring groove. The sealing ring assembly includes at least one ring segment configured to seal between the low-pressure region and the high-pressure region, and at least one wire engaged with the at least one ring segment causing the at least one ring segment to be in compression and the at least one wire to be in tension. In some embodiments, the sealing ring assembly is configured for oil-less operation in the bore. In some embodiments, for example, the at least one wire includes a metal or a carbon fiber.

BRIEF DESCRIPTION OF THE DRAWINGS

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein

DETAILED DESCRIPTION

Figure 1:
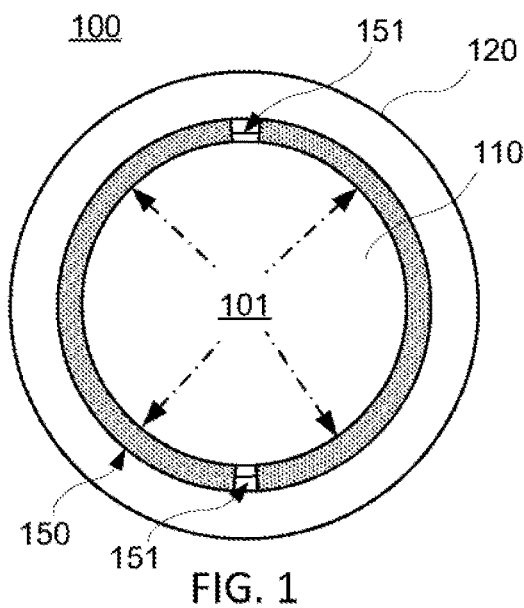
FIG. 1 shows a cross-sectional end view of a portion of an illustrative piston and cylinder assembly, with a non-worn sealing ring assembly, in accordance with some embodiments of the present disclosure.

In accordance with the present disclosure, a sealing ring assembly may include a composite structure. The composite structure may include at least two materials, the first of which includes a relatively brittle material (e.g., a polymer, or ceramic such as graphite), and the second of which has relatively higher tensile strength (e.g., a metal, metal alloy, metallic solid, carbon fiber, or other material). The two materials may be engaged at an interface to cause the brittle material to be in compression and the second material to be in tension. Accordingly, the composite structure may be relatively more resilient than the brittle material alone when used as a seal, subjected to the environment in a bore of a piston-cylinder device. It will be understood that a "brittle material" or a "relatively brittle material," as used herein, refers to a material that is weak in tension (e.g., as compared to a reinforcement material) but strong in compression. Accordingly, materials such as ceramics (e.g., graphite) and polymers, for example, may be referred to herein as brittle materials in the context of sealing ring assemblies. Brittle materials may also include composite structures that are relatively brittle, even if they include minor constituents that are not themselves brittle (e.g., metal additives or other materials). Further, materials used for reinforcement may include materials having a higher relative strength in tension such as, for example, metals or carbon fiber. A reinforcement may include a material that would otherwise be brittle but is included in the structure that is effectively less brittle than a ring segment. It will also be understood that "self-lubricating material," as used herein, refers to a material that deposits (e.g., via rubbing or attrition) onto a surface and acts as a solid lubricant to prevent galling or scuffing of components in relative motion. For example, graphite may be referred to herein as a self-lubricating material.

The term "seal" as used herein, refers to the creation, maintenance, or both, of a high-pressure region and a low-pressure region. For example, a seal may include a sealing ring assembly that is configured to reduce a leakage rate of gas from a high-pressure region to a low-pressure region, by limiting flow between a high-pressure boundary and a low-pressure boundary of the seal. Accordingly, a seal can be defined in terms of its constraints on a leakage rate. It will be understood that a seal, or sealing ring assembly, as described herein, may have any suitable corresponding leakage rate. For example, in some circumstances, a relatively worse seal may allow more leakage, but may be acceptable based on some performance criterion. In a further example, a sealing ring assembly having reinforcement and configured for high efficiency operation of a piston and cylinder device may have a relatively low leakage rate (e.g., be a more effective seal).

In some embodiments, a sealing ring assembly may include at least one ring segment, which may include a relatively brittle material. In some embodiments, the second material may be a metal layer, affixed to the ring segment. In some embodiments, the second material may be in the form of a wire, engaged with the ring segment.

As used herein, a "ring segment" shall refer to a sealing element extending for an azimuthal angle greater than zero degrees, having a radially outer surface, and configured to seal at least along a portion of the radially outer surface against a bore. A ring segment may include end faces, if not azimuthally contiguous around the full bore.

As used herein, a "ring" shall refer to a sealing element including at least one ring segment, which may be, but need not be, azimuthally contiguous along a bore. For example, a ring may include one ring segment, in which case these terms overlap. In a further example, a ring may include four ring segments, in which case the ring refers to the collective of the four ring segments. A ring may include, but need not include, one or more interfaces between one or more ring segments. A "ring" shall also refer to a sealing element including at least one ring segment configured to seal against a land of a piston.

As used herein, a "gap cover element" shall refer to a sealing element configured to seal against one or more ring segments at an interface, and to seal against at least a portion of a bore during wear of the one or more ring segments. While a gap cover element may function as a ring segment as the ring wears, for purposes of the discussion in the present disclosure, a gap cover element is not considered to be a ring segment for purposes of clarity.

As used herein, a "sealing ring assembly" shall refer to an assembly of one or more rings, and sometimes also one or more gap covers elements, configured to engage with a piston and configured to seal between a high-pressure region and a low-pressure region of a cylinder. For example, a single ring segment may be a ring and a sealing ring assembly. In a further example, several ring segments and corresponding gap covers may be a sealing ring assembly.

Figure 2:
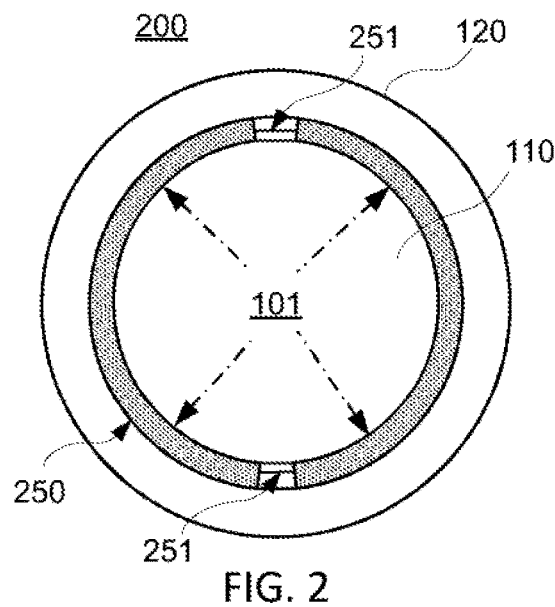
FIG. 2 shows a cross-sectional end view of a portion of an illustrative piston and cylinder assembly, with a worn sealing ring assembly, in accordance with some embodiments of the present disclosure.

FIG. 1 shows a cross-sectional end view of a portion of an illustrative piston and cylinder assembly 100 (e.g., including piston 110 and cylinder 120), with non-worn sealing ring assembly 150, in accordance with some embodiments of the present disclosure. FIG. 2 shows a cross-sectional end view of a portion of illustrative piston and cylinder assembly 200 (e.g., including piston 110 and cylinder 120), with worn sealing ring assembly 250, in accordance with some embodiments of the present disclosure. As sealing ring assembly 150 of FIG. 1 undergoes wear, it may eventually resemble sealing ring assembly 250 of FIG. 2. For example, gaps 151 may widen to resemble gaps 251. Pressure (e.g., from a high-pressure region), shown by vectors 101, pushes sealing ring assembly 150 outward during operation, which may aid in sealing the piston-cylinder device. As a sealing ring assembly wears, gaps 251 may form between adjacent ring segments. Gaps 251, if not accounted for, lead to increased leakage and poorer performance of the piston-cylinder device.

Figure 3:
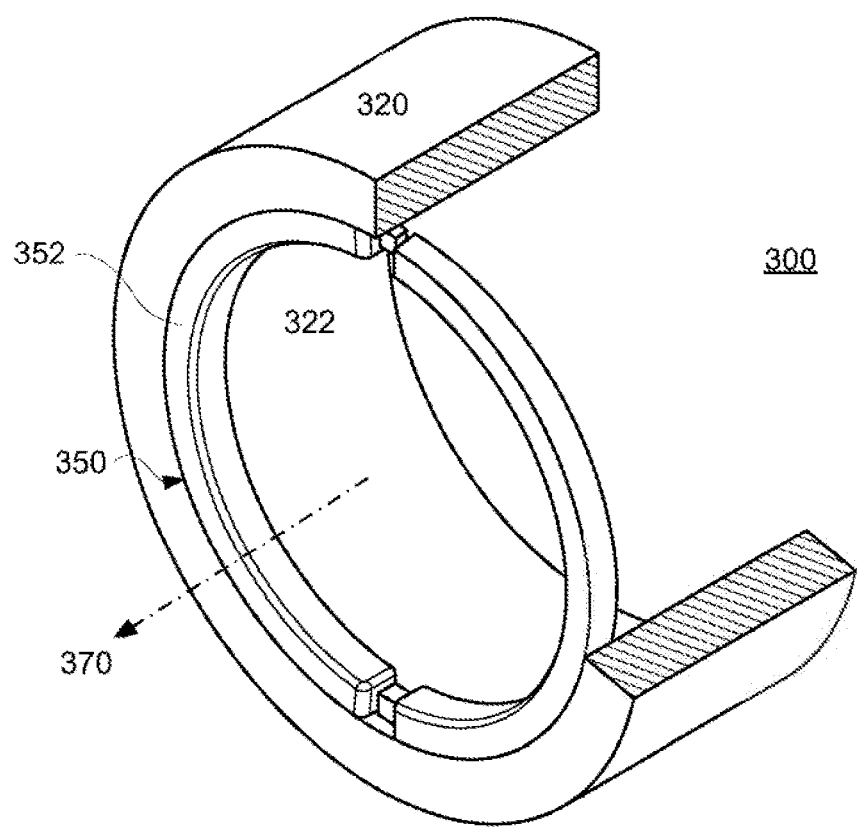
FIG. 3 shows a cross-sectional perspective view of a portion of an illustrative piston and cylinder assembly, with a sealing ring assembly, in accordance with some embodiments of the present disclosure.

FIG. 3 shows a cross-sectional perspective view of a portion of illustrative piston and cylinder assembly 300, with sealing ring assembly 350, in accordance with some embodiments of the present disclosure. Note that although no piston is illustrated in FIG. 3 for purposes of clarity, sealing ring assembly 350 is configured to be arranged in a ring groove of a piston within bore 322. Sealing ring 350 may be configured to move with a piston along axis 370 during, for example, a piston stroke.

Sealing ring assembly 350 includes first sealing ring 352, which each include two respective ring segments. For example, sealing ring 352 includes two ring gaps as shown in FIG. 3. Accordingly, by not aligning (e.g., azimuthally) the ring gaps of adjacent sealing rings, significant leakage may be prevented as sealing ring assembly 350 wears.

In accordance with the present disclosure, in some embodiments, a sealing ring assembly, or ring segment thereof, is created out of a metal-graphite (or any other suitable metal-ceramic) composite structure. For example, referencing sealing ring assembly 350 of FIG. 3, sealing ring 352 may include a composite structure. Although not shown in FIG. 3, a sealing ring assembly may include more than one ring, with each ring including one or more respective ring segments. In some embodiments, in which more than one ring is included, one or more rings, or all of the rings, may include reinforcement, in accordance with some embodiments of the present disclosure.

In an illustrative example, a composite structure may be created by bonding (e.g., brazing or adhering) a thin sheet of metal to the inner diameter (ID) of a ceramic ring or ring segment. In some embodiments, the composite structure moves the graphite boundary on the ID of the ring or ring segment closer to the neutral axis. Accordingly, the "extreme fibers" of the composite structure (e.g., which see the highest tensile stresses when expanding to seal) are arranged in the metal layer rather than in the ceramic. In some embodiments, the composite structure puts the ID of a sealing ring in compression in its neutral state, resulting in compressive "preloading" that counteracts tensile loads induced during expansion. In some embodiments, the composite structure increases the bending stiffness of a sealing ring, which reduces likelihood of breakage when operating over an unsupported span in a cylinder (e.g., such as a port for gas exchange).

Figure 4:
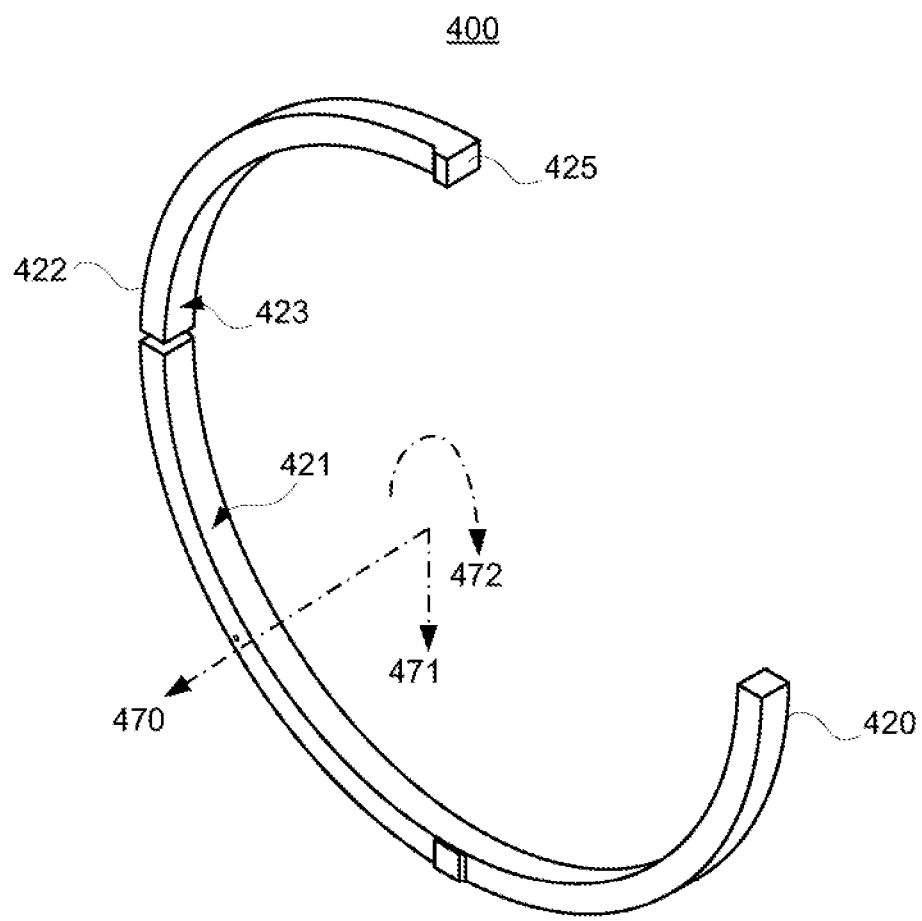
FIG. 4 shows a cross-sectional perspective view of a portion of an illustrative sealing ring assembly, with ring segments and reinforcements, in accordance with some embodiments of the present disclosure.
Figure 5:
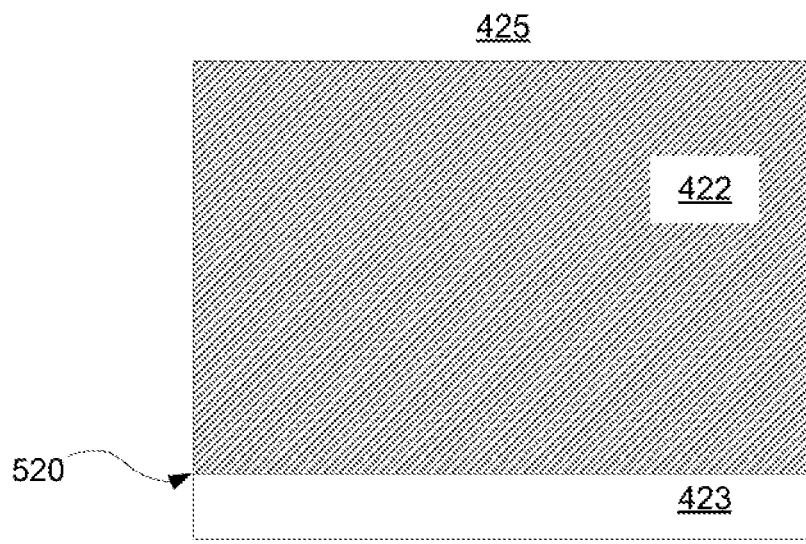
FIG. 5 shows a cross-sectional view of the illustrative sealing ring assembly of FIG. 4, with a ring segment and a reinforcement, in accordance with some embodiments of the present disclosure.

FIG. 4 shows a cross-sectional perspective view of portion 400 of an illustrative sealing ring assembly, with ring segments 420 and 422 and respective reinforcements (e.g., metal layers) 421 and 423, in accordance with some embodiments of the present disclosure. In FIG. 4, axis 470 is in axial direction, axis 471 is in the radial direction, and axis 472 is in the azimuthal direction (e.g., around axis 470). Reinforcement 421 is affixed to ring segment 420, azimuthally along an inner radial surface of ring segment 420. Reinforcement 423 is affixed to ring segment 422, azimuthally along an inner radial surface of ring segment 422. In some embodiments, reinforcements such as metal layers, for example, are brazed onto suitable surfaces of respective ring segments 420 and 422. FIG. 5 shows a cross-sectional view of illustrative sealing ring assembly 400 of FIG. 4, defined by section 425 of FIG. 4, with a ring segment 422 and reinforcement 423, in accordance with some embodiments of the present disclosure. Interface 520 is defined as the spatial region where ring segment 422 meets reinforcement 423. Interface 520 may include one or more materials arranged between ring segment 422 and reinforcement 423. In some embodiments, interface 520 includes brazing material, adhesive, any other suitable material that may transmit shear forces between ring segment 422 and reinforcement 423, or any combination thereof.

In some embodiments, a reinforcement such as, for example, a metal layer, is segmented, including two or more segments arranged azimuthally along a sealing ring. In some embodiments, a reinforcement may include more than one layer or lamination. For example, referencing FIG. 5, reinforcement 423 may be replaced by several metal layers, bonded in a stack, and each having corresponding composition and properties.

In an illustrative example, a ring segment (e.g., a ring segment of sealing ring 352 of FIG. 3, or ring segment 422 of FIGS. 4-5) may include a reinforcement that includes a brazed metal layer at its ID. The metal layer may, as an illustrative example, be made of 0.005" thick molybdenum, and may be brazed to the ring segment (e.g., using a brazing foil to affect the bond). The metal layer may have any suitable thickness and metal composition as appropriate for the application and particular properties of the ring segment (e.g., a graphite body to which the reinforcement is affixed). It will be understood that, in a two-ring arrangement, any suitable arrangement of sealing rings, having any suitable ring segments, may be used and that a reinforcement may be affixed to one or more of the ring segments in accordance with the present disclosure.

In some embodiments, a metal material used as a reinforcement is selected based on a value of its coefficient of thermal expansion (CTE) as compared to the CTE of the ceramic. Selecting materials which have closely matching CTEs near operating temperatures (e.g., of an engine, air compressor, or other piston-cylinder device) reduces thermally induced stresses in the joint (i.e., interface) during operation. In some embodiments, a difference in CTEs of the two materials, at brazing temperatures, can be taken into consideration to optimize between residual stresses in the braze joint and inducing a compressive preload in the relatively brittle material. For example, to cause a compressive preload in the brittle material (e.g., graphite), a reinforcement material may be selected having slightly higher CTE than the brittle material, at a brazing temperature. Accordingly, when the sealing ring assembly cools, the reinforcement may shrink in arc length relatively more than the ring segment, and contract the brittle material along its ID. However, in some circumstances, a reinforcement (e.g., a metal) having a CTE, at a brazing temperature, that is too large compared to the brittle material may cause the braze joint to fail due to high residual stress. In some embodiments, for example, a reinforcement may be selected based on tensile strength and CTE at a suitable temperature.

In some embodiments, a CTE of a ring or ring segment and a CTE of a reinforcement are matched. For example, a ring segment may include graphite, and a reinforcement may include Molybdenum (e.g., 99% pure Molybdenum or any other suitable grade), Tungsten, Ni-Resist D5, Kovar, Invar, or any other suitable material or combination of materials. Matched CTEs, as referred to herein, refers selecting a brittle material and reinforcement material having corresponding CTE values that achieve some suitable constraining criterion. For example, the criterion may include the CTEs being within a threshold (e.g., at a temperature), the CTE mismatch being within a threshold (e.g., at a temperature), a maximum expansion of the components being within threshold (e.g., at a temperature), a maximum stress at an interface of the materials, or a combination thereof. In an illustrative example, a threshold such as 40% difference in CTEs may be considered matched, while a 200% difference in CTEs may be considered unmatched. Any suitable threshold, depending on any suitable constraints, may be used to determine matching of CTEs. In some embodiments, CTEs need not be matched, or otherwise impact material selection. For example, in some such embodiments, referring to a graphite ring segment, a reinforcement may include a stainless steel alloy, a nickel alloy, or any other suitable material.

Under some conditions when in operation, a sealing ring assembly stretches outward under pressure forces to conform to the cylinder bore. When this happens, the highest tensile stresses arise at the ID of the sealing ring assembly and the highest compressive stresses arise at the outer diameter (OD) of the sealing ring assembly. The tensile stresses due to stretching and the compressive stresses due do the braze joint at the ID of the brittle material are additive. The resulting sum of the stresses at the ID is much lower than in an equivalently sized ceramic-only ring (i.e., without a metal layer), for example. Additionally, even without the compressive preload effect, if one considers the ring as a beam in bending during its expansion, it is the extreme fibers of the beam (i.e., the material at the very surface of the OD and ID of the ring, farthest from the neutral axis) that experience the greatest stresses. Replacing, or adding to, the material at the ID of the beam (i.e., the surface that experiences the greatest tensile stresses in bending) with a material that has much higher tensile strength reduces the likelihood of failure (e.g., fracturing of a ceramic). While tensile stress on the ID of a sealing ring or ring segment is a primary concern, other stresses may occur and impact material selection, reinforcement, or both. For example, a sealing ring assembly axially crossing breathing ports and bridges may present stresses that are addressed by inclusion of a suitable reinforcement. In some embodiments, a reinforcement need not be included at, or only at, an ID of a sealing ring. For example, a reinforcement may be included and affixed to an axial face of a sealing ring of a relatively brittle material, thereby reducing the likelihood of a failure. A reinforcement may be included at any suitable location of a sealing ring, and form any suitable interface with the sealing ring, in accordance with the present disclosure.

When the overall ring structure includes a composite of two materials, the bending strength and stiffness may be greater than an equivalently sized section of a single-material (e.g., the brittle material only) sealing ring, or ring segment thereof. This may be especially beneficial when, for example, the sealing ring assembly translates (e.g., in the axial direction) over open ports where the ring may be supporting a load across the open span between port bridges (i.e., the solid material between ports).

In some embodiments, the dimensions (e.g., thickness), composition, or both, of the metal layer are selected to provide a desired stiffness of the composite structure, a desired pre-compression of the ceramic, or both. In some embodiments, for example, a single split ring (i.e., a sealing ring having one ring segment) benefits from the addition of a brazed metal layer onto the ID.

The present disclosure directed to reinforcements is applicable when, for example, a sealing ring is made from a material such as polymers or ceramics that are relatively strong in compression but relatively weak in tension. For example, such materials may be used in circumstances where the sealing ring assembly is operated without traditional oil lubrication (e.g., and is configured to wear against a cylinder bore via direct contact).

In an illustrative example, a sealing ring assembly may include at least one ceramic ring or ring segment, and at least one metal sheet layer brazed or otherwise affixed to the at least one ceramic ring or ring segment. The metal sheet layer provides a compressive preloading onto the at least one ceramic ring or ring segment. The at least one ceramic ring may be created from graphite, for example.

In some embodiments, a composite structure is created by embedding one or more wires through, or near to, the radial center of a ring segment. In some such embodiments, the wire is affixed to the ring segment (e.g., by attaching to an end cap at each end of the ring segment arc). A composite structure may include a sealing ring, or ring segment thereof, and a metal layer, a wire, or both.

In some embodiments, a wire reinforcement is attached to the end caps by threading (e.g., engaging corresponding male and female threads), crimping, brazing, any suitable mechanical method, or any combination thereof. In some embodiments, a wire reinforcement is affixed to a sealing ring, or ring segment thereof, by brazing the wire to the ceramic along its length (e.g., in the azimuthal direction). For example, a wire may be affixed to both front and rear sealing rings of a twin-ring style sealing ring assembly, to a sealing ring having a single ring segment, to a sealing ring having a greater number of ring segments (i.e., more than two), to any other suitable sealing ring architecture, or any suitable combination thereof.

Figure 6:
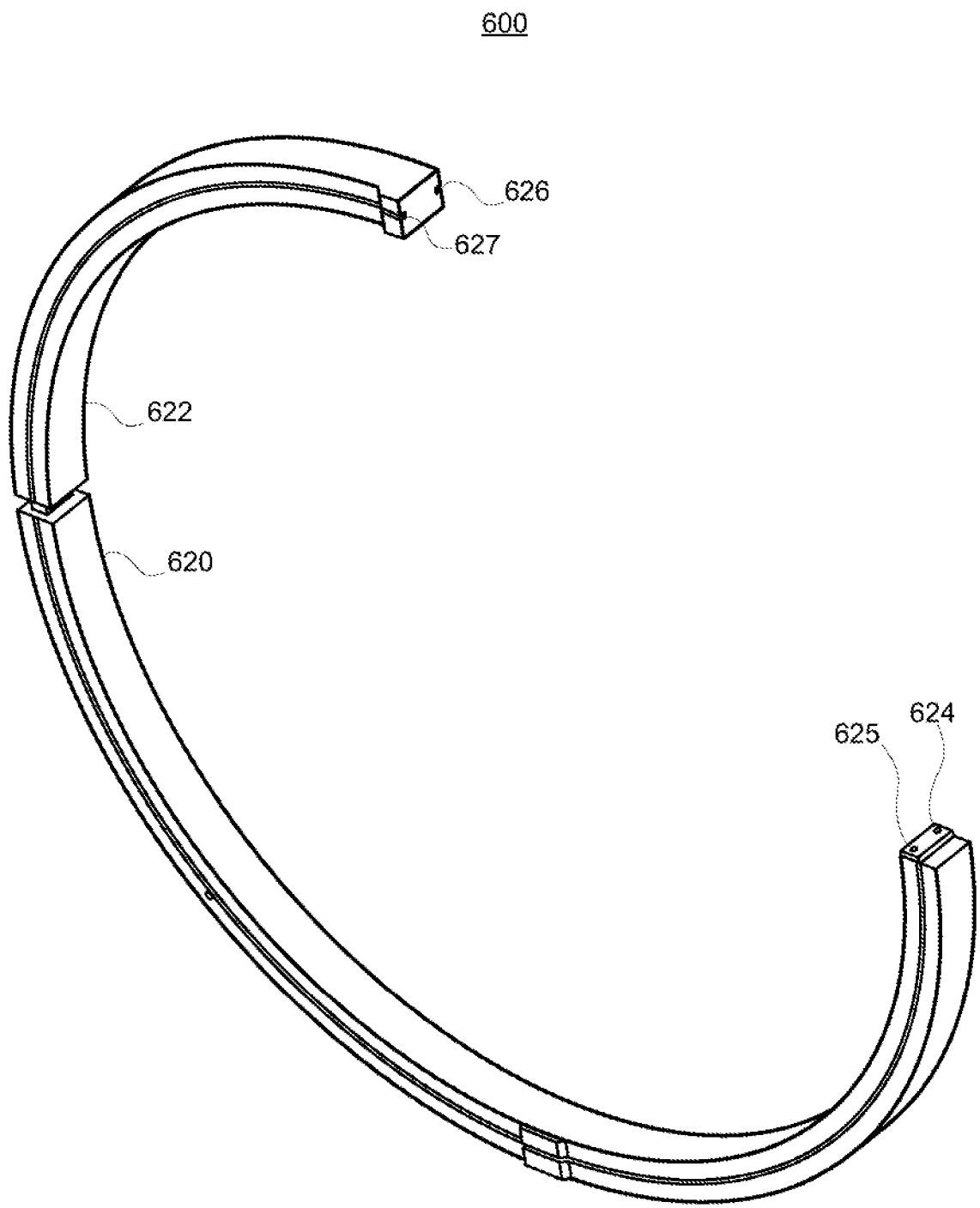
FIG. 6 shows a cross-sectional perspective view of a portion of an illustrative sealing ring assembly, with ring segments with wire reinforcement, in accordance with some embodiments of the present disclosure.

FIG. 6 shows a cross-sectional perspective view of portion 600 of an illustrative sealing ring assembly 600, with ceramic ring segments 620 and 622, having wire reinforcement, in accordance with some embodiments of the present disclosure. Wires 624 and 625 are in tension and engaged with ring segment 620, placing ring segment 620 in compression. Wires 626 and 627 are in tension and engaged with ring segment 622, placing ring segment 622 in compression. Note that portion 600 is a sealing ring assembly, minus a roughly 90° portion for purposes of clarity.

Figure 7:
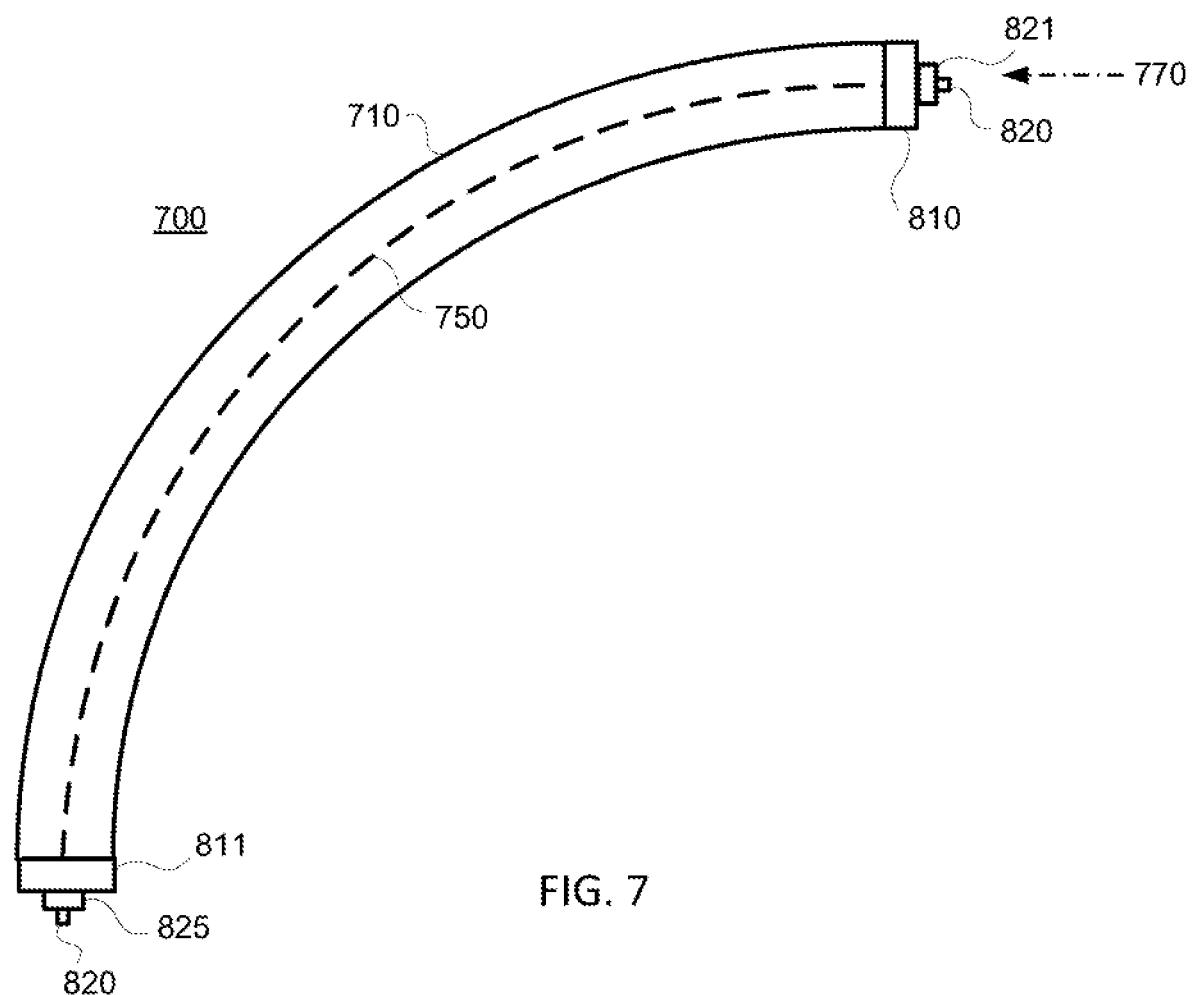
FIG. 7 shows a side view of a portion of an illustrative sealing ring assembly, having a ring segment with wire reinforcement, in accordance with some embodiments of the present disclosure.

FIG. 7 shows a side view of a portion 700 of an illustrative sealing ring assembly, having ceramic ring segment 710 with wire 820, in accordance with some embodiments of the present disclosure. Ring segment 710 may be one ring segment of a plurality of ring segments that collectively form a sealing ring or sealing ring assembly. Ring segment 710 includes a passage 750, along which wire 820 is arranged. The ends of wire 820 extend azimuthally (e.g., along axis 770) past end caps 810 and 811. End caps 810 and 811 may include a material having any suitable properties such as, for example, a metal, a ceramic, a plastic, or any combination thereof. Wire 820 is held in tension by fasteners (e.g., tensioning terminations 821 and 825), which may include threaded-on fasteners (e.g., nuts), crimped connections, any other suitable securement, or any combination thereof, that causes wire 820 to be in tension and ring segment 710 to be in compression.

Figure 8:
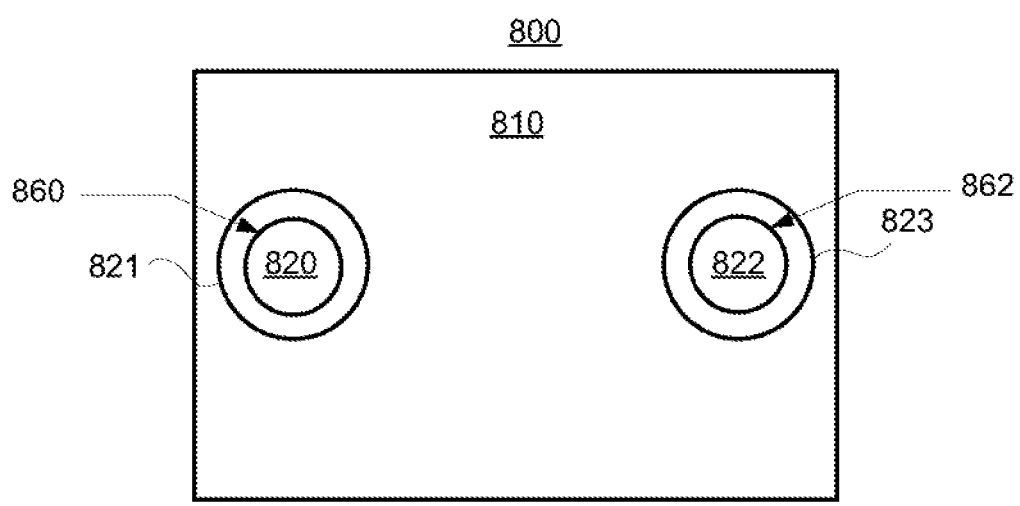
FIG. 8 shows an end view of the illustrative portion of FIG. 7, with ring segments with wire reinforcement, in accordance with some embodiments of the present disclosure.

FIG. 8 shows an end view of illustrative portion 700 of FIG. 7, in accordance with some embodiments of the present disclosure. End cap 810 includes two holes, each accommodating one of wires 820 and 822, but not tensioning terminations 821 and 823 (e.g., the diameter of the holes is greater than the diameter of wires 820 and 822 but less than the width of fasteners 821 or 823). Tensioning terminations 821 and 823 are affixed to ends of respective wires 820 and 822, thus placing wires 820 and 822 in tension. Note that there are similar tensioning terminations and an endcap at the other (i.e., not shown in FIG. 8) end of wires 820 and 822. The tension force is reacted against end cap 810, and opposite end cap 811, thus placing ring segment 710 in compression (e.g., as a preload). As shown in FIG. 8, wires 820 and 822 are affixed to respective tensioning terminations 821 and 823 at respective interfaces 860 and 862, which may include threaded interfaces, crimped interfaces, affixed interfaces, or any other suitable interface providing securement.

In some embodiments, a threaded wire is placed in tension against end caps, which are arranged at ends of a ring segment, using nuts by applying a specified torque to the nuts, thus drawing the wire into tension. This tension is reacted against the end caps which results in compression of the ring segment (e.g., which may be made of polymer, graphite or other ceramic). Accordingly, the ring segment is in compression in its neutral state. This compressive "preloading" of the ring segment counteracts the tension induced during expansion (e.g., during operation of a piston-cylinder device). This lowered state of tensile stress during operation increases the survivability of the ceramic and allows for a higher ultimate wear limit of the ceramic. In some embodiments, a ring segment may be in compression during a portion of a stroke of a piston-cylinder device, all of a stroke of a piston-cylinder device, when not in operation, or any suitable combination thereof. For example, a reinforcement may apply a preload on the ring segment (e.g., putting the ring segment in compression), even when not operating. In a further example, a preload need not be applied, and the reinforcement need not be in tension until pressure forces are applied (e.g., during operation).

In some embodiments, the present disclosure is directed to a metal wire reinforcement useful, for example, when a sealing ring is made from a material, such as graphite or other ceramic, that is very strong in compression but weak in tension. For example, such materials may be used in circumstances where the sealing ring assembly is operated without traditional oil lubrication (e.g., and is configured to wear against a cylinder bore).

In an illustrative example, a sealing ring assembly may include at least one ring or ring segment, and at least one metallic wire extending through or on at least a portion of the at least one ceramic ring or ring segment. The metallic wire is tensed to provide a compressive preloading onto the at least one ceramic ring or ring segment. Further, the sealing ring assembly may include at least one end cap attached to an end of the at least one ring segment and to an end of the at least one metallic wire.

Figure 9:
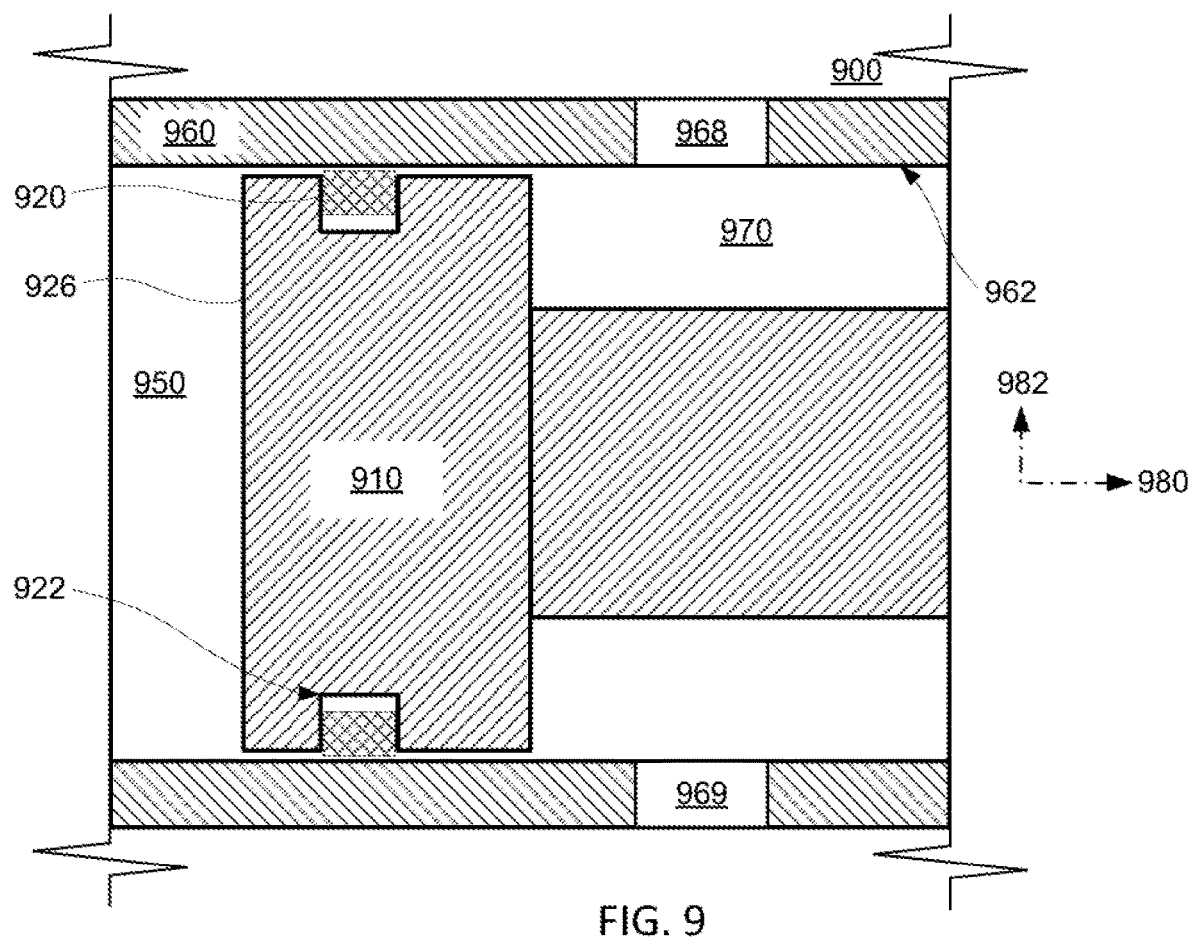
FIG. 9 shows a perspective view of an illustrative piston and cylinder assembly, in accordance with some embodiments of the present disclosure.

FIG. 9 shows a perspective view of illustrative piston and cylinder assembly 900, in accordance with some embodiments of the present disclosure. Cylinder 960 may include bore 962, which is the inner cylindrical surface in which piston assembly 910 travels. Piston assembly 910 may include piston 926, which includes a sealing ring groove 922, in which sealing ring assembly 920 is configured to ride. As piston assembly 910 translates along the axial direction shown by axis 980 (e.g., during an engine cycle), in cylinder 960, the gas pressure in high-pressure region 950 may change (high-pressure region 950 may be closed with a cylinder head or an opposing piston). For example, as piston assembly 910 moves opposite the direction of axis 980 (i.e., to the left in FIG. 9), the pressure in high-pressure region 950 may increase. Low-pressure region 970, located to the rear of sealing ring assembly 920 may be at a gas pressure below the pressure of high-pressure region 950 for at least some, if not most, of a piston stroke or cycle of the piston and cylinder assembly. The pressure ranges in high-pressure region 950 and low-pressure region 970 may be any suitable ranges (e.g., sub-atmospheric pressure to well over 250 bar), and may depend on compression ratio, breathing details (e.g., boost pressure, pressure waves, port timing), losses, thermochemical properties of gases, and reaction thereof. Accordingly, the sealing ring assemblies described herein may be used to seal any suitable high-pressure region and low-pressure region, having any suitable pressure ranges. For example, in some embodiments, low pressure region 970 may interact flow-wise with intake or exhaust ducting that is in communication with ports 968 or 969, and be maintained relatively near to a pressure in the ducting. In an illustrative example, low-pressure region 970 may open to intake breathing ports 968 or 969, and may be at a pressure near to or strongly affected by (e.g., on average) an intake pressure (e.g., a boost pressure). In a further illustrative example, low-pressure region 970 may open to exhaust breathing ports 968 or 969, and may be at a pressure near to or strongly affected by (e.g., on average) an exhaust pressure. In accordance with the present disclosure, sealing ring assemblies may be used to seal high-pressure regions from low-pressure regions for at least part of a piston stroke or cycle of a piston and cylinder assembly. It will be understood that the "front" of sealing ring assembly 920 refers to the face axially nearest high-pressure region 950, and the "rear" of sealing ring assembly 920 refers to the face axially nearest low-pressure region 970.

It will be understood that unless otherwise specified, all pressures referred to herein are in absolute units (e.g., not gage or relative).

In some embodiments, low-pressure region 970 may include, communicate gas pressure with, or otherwise be open to ports 968 and 969 for gas exchange. For example, ports 968 and 969 may be exhaust ports, intake ports, or both. Ports may be, but need not be, opened and closed using valves. For example, in some embodiments, ports 968 and 969 refer to openings coupled to a manifold or other flow plenum, without valves included (e.g., flow is control by covering and uncovering ports 968 and 969 by sealing ring assembly 920). In a further example, in some embodiments, ports 968 and 969 refer to openings coupled to a manifold or other flow plenum, with valves included to control flow profiles and timing. The term "valve" may refer to any actuated flow controller or other actuated mechanism for selectively passing matter through an opening, including but not limited to: ball valves, plug valves, butterfly valves, choke valves, check valves, gate valves, leaf valves, piston valves, poppet valves, rotary valves, slide valves, solenoid valves, 2-way valves, or 3-way valves. Valves may be actuated by any means, including but not limited to: mechanical, electrical, magnetic, camshaft-driven, hydraulic, or pneumatic means.

It will be understood that high-pressure and low-pressure may refer to transient pressure states of a piston and cylinder device. For example, referencing an engine cycle, the high-pressure side of a sealing ring assembly may have a pressure greater than a low-pressure side of the sealing ring assembly for most of the engine cycle (e.g., except possibly during breathing or near-breathing portions of the cycle). Accordingly, high-pressure and low pressure are relative and depend on the conditions of the gas being sealed.

A sealing ring assembly may be used to seal a high pressure and a low-pressure region, each operating in any suitable pressure range. It will also be understood that a sealing ring assembly may seal differently at different positions in a cycle. It will be further understood that a low-pressure region may include a pressure greater than a pressure of a high-pressure region for some of a piston stroke or cycle of a piston and cylinder assembly. For example, a sealing ring assembly may always seal a high-pressure region from a low-pressure region. In a further example, a sealing ring assembly may seal a high-pressure region from a low-pressure region as long as the pressure in the high-pressure region is greater than the pressure in the low-pressure region. In a further example, a sealing ring assembly may seal a high-pressure region from a low-pressure region as long as the pressure in the high-pressure region is greater than the pressure in the low-pressure region, and conversely, seal a low-pressure region from a high-pressure region as long as the pressure in the low-pressure region is greater than the pressure in the high-pressure region.

In some embodiments, sealing ring assembly 920 may deposit material on bore 962 of cylinder 960 (e.g., include a self-lubricating material). Deposited material may lubricate the bore-to-sealing ring assembly interface between bore 962 and sealing ring assembly 920 (e.g., provide a dry lubricant). Accordingly, in some embodiments, piston and cylinder assembly 900 may operate without oil for lubrication.

In some embodiments, sealing ring assembly 920 includes a metal layer, a metal wire, or both, or any other suitable reinforcement, and is configured to prevent contact between bore 962 and the metal layer or the metal wire.

In some embodiments, piston 926 may be an open-faced piston. For example, piston 926 may include openings, cutouts, or other fluid paths from high pressure region 950 to ring groove 922. Accordingly, in some embodiments employing an open-faced piston, the inner radial surfaces (e.g., referencing axis 982 in the radial direction in FIG. 9) of sealing ring assembly 920 may be exposed to gas pressure of high pressure region 950.

Figure 10:
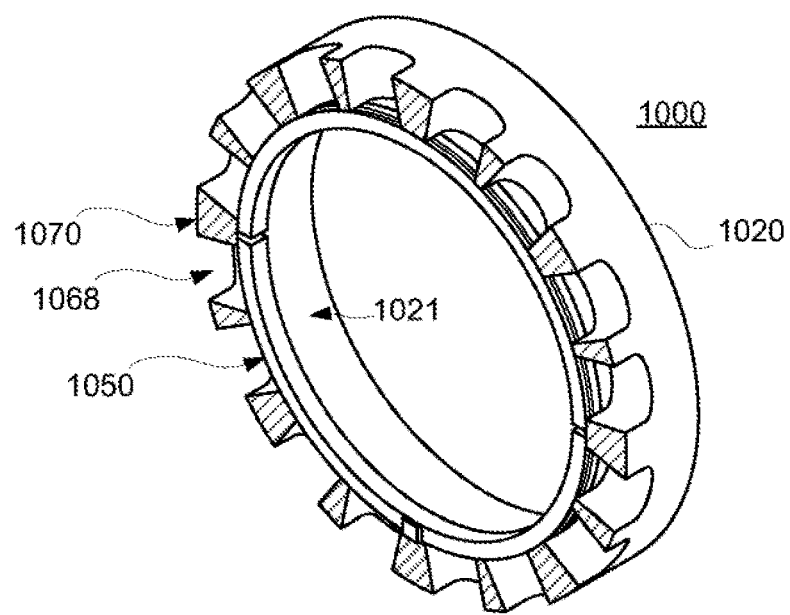
FIG. 10 shows a cross-sectional perspective view of an illustrative sealing ring assembly in the bore of a cylinder, in accordance with some embodiments of the present disclosure.

FIG. 10 shows a cross-sectional perspective view of illustrative sealing ring assembly 1050 in bore 1021 of cylinder 1020, in accordance with some embodiments of the present disclosure. Cylinder 1020 includes ports 1068, arranged in between port bridges 1070. Ports 1068 are openings in bore 1021, configured to allow gas exchange (e.g., engine breathing of intake, exhaust, or both). As sealing ring assembly 1050 axially passes over ports 1068 and port bridges 1070, it may experience uneven, or reduced, inward force from bore 1021. The composite structure of sealing ring assembly 1050 may reduce tensile stresses in a ring segment of sealing ring assembly 1050 when crossing ports 1068.

Figure 11:
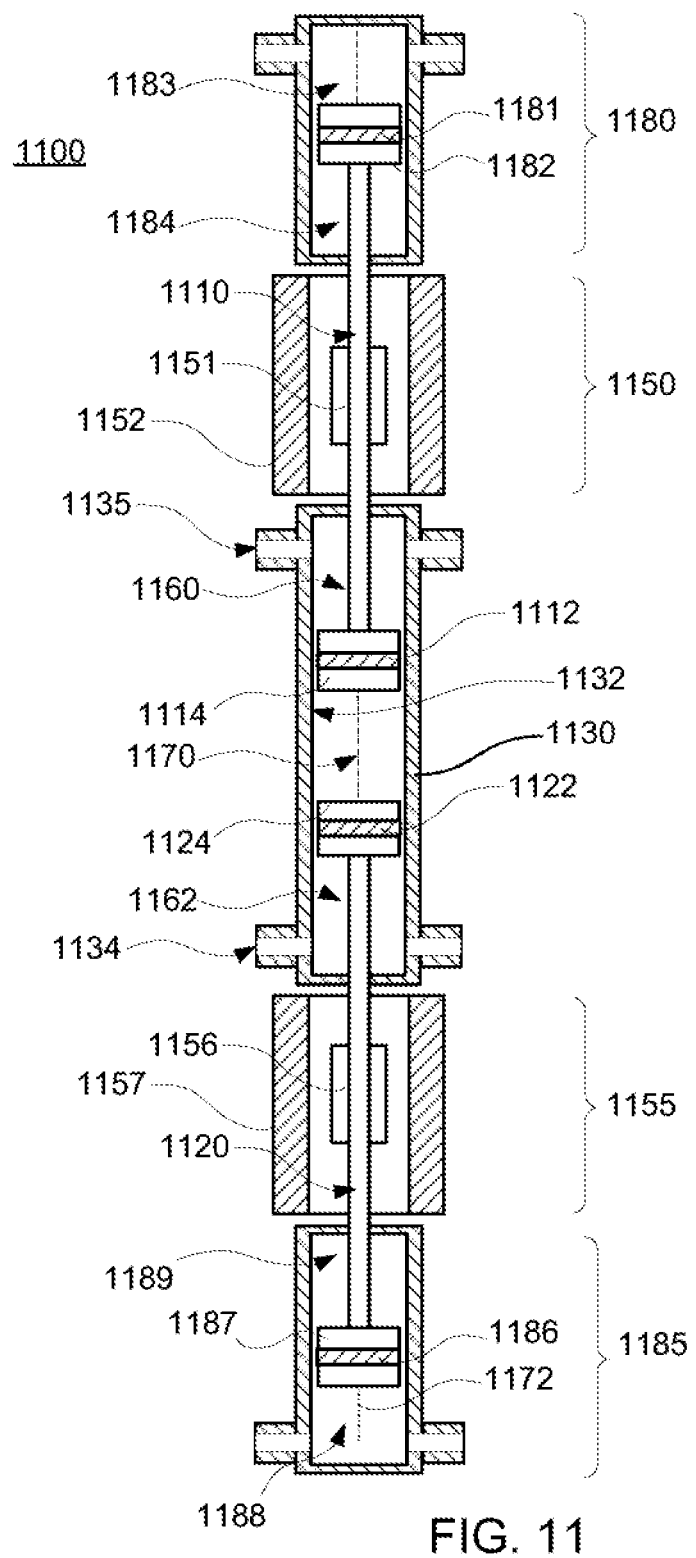
FIG. 11 shows a cross-sectional view of an illustrative device, including a sealing ring assembly, in accordance with some embodiments of the present disclosure.

FIG. 11 shows a cross-sectional view of illustrative device 1100 including two free piston assemblies 1110 and 1120 that include respective sealing ring assemblies 1112 and 1122 in accordance with some embodiments of the present disclosure. In some embodiments, device 1100 may include linear electromagnetic machines 1150 and 1155 to convert between kinetic energy of respective free piston assemblies 1110 and 1120 and electrical energy. In some embodiments, device 1100 may include gas regions 1160 and 1162, which may, for example, be at a relatively lower pressure than gas region 1170 (e.g., a high-pressure region) for at least some, if not most, of a cycle (e.g., an engine cycle, or an air compression cycle). For example, gas regions 1160 and 1162 (e.g., low pressure regions) may be open to respective breathing ducting (e.g., an intake manifold, an intake system, an exhaust manifold, an exhaust system). To illustrate, breathing ports 1134 and 1135 are configured to provide reactants to, and remove exhaust from, bore 1132 of cylinder 1130. In a further example, gas regions 1160 and 1162 may be vented to atmosphere (e.g., be at about 1.01 bar absolute pressure). In some embodiments, device 1100 may include gas springs 1180 and 1185, which may be used to store and release energy during a cycle in the form of compressed gas (e.g., a driver section). For example, free piston assemblies 1110 and 1120 may each include respective pistons 1182 and 1187, having grooves for respective sealing ring assemblies 1181 and 1186, to seal respective gas regions 1183 and 1188 (e.g., high-pressure regions) from respective gas regions 1184 and 1189 (e.g., low-pressure regions).

Cylinder 1130 may include bore 1132, centered about axis 1172. In some embodiments, free piston assemblies 1110 and 1120 may translate along axis 1172, within bore 1132, allowing gas region 1170 to compress and expand. For example, gas region 1170 may be at relatively high pressure as compared to gas region 1160 for at least some of a stroke of free piston assemblies 1110 and 1120 (e.g., which may translate along axis 1172 in opposed piston synchronization). Sealing ring assemblies 1112 and 1122 may seal gas region 1170 from respective gas regions 1160 and 1162 within bore 1132. In some embodiments, free piston assemblies 1110 and 1120 may include respective pistons 1114 and 1124, and respective sealing ring assemblies 1112 and 1122 which may be arranged in respective corresponding grooves of pistons 1114 and 1124. It will be understood that gas regions 1160 and 1162, and gas region 1170, may change volume as free piston assemblies 1110 and 1120 move or are otherwise positioned at different locations along axis 1172. The portions of respective sealing ring assemblies 1112 and 1122 nearest gas region 1170 are each termed the front, and the portion of sealing ring assemblies 1112 and 1122 nearest respective gas regions 1160 and 1162 are each termed the rear. Sealing ring assemblies 1112 and 1122 may each include a high-pressure boundary, which may each depend on a pressure in gas region 1170. For example, a high-pressure boundary of sealing ring assembly 1112 may be open to gas region 1170 (e.g., coupled by one or more orifices, or other opening), and have a corresponding pressure the same as (e.g., if gas from gas region 1170 is unthrottled in the sealing ring assembly), or less than (e.g., if gas from gas region 1170 is throttled in the sealing ring assembly), the pressure of gas region 1170. Sealing ring assemblies 1112 and 1122 may each include a low-pressure boundary, which may depend on a gas pressure in respective gas regions 1160 and 1162. For example, a low-pressure boundary of sealing ring assembly 1112 may be open to gas region 1160 and have a corresponding pressure about the same as the pressure of gas region 1160. In some embodiments, as sealing ring assemblies 1112 an 1122 axially pass over respective ports 1135 and 1134 (e.g., and corresponding port bridges, although not shown), they may experience uneven, or reduced, inward force from bore 1132. The composite structure of sealing ring assemblies 1112 and 1122 may reduce tensile stresses in a respective ring segment of each of sealing ring assemblies 1112 and 1122 when crossing ports 1135 and 1134.

In some embodiments, pistons 1114 and 1124 may each include one or more grooves into which one or more respective sealing ring assemblies may be arranged. For example, as shown in FIG. 11, pistons 1114 and 1124 may each include one groove, into which sealing ring assembly 1112 and sealing ring assembly 1122 may be installed, respectively. In a further example, although not shown in FIG. 11, piston 1114 may include two grooves, in which two respective sealing ring assemblies may be installed. In a further example, piston 1114 may include two grooves, the first sealing ring assembly 1112, and the second (not shown), arranged to the rear of sealing ring assembly 1112, but with its front nearer to gas region 1160, thereby sealing pressure in gas region 1160 to pressure between the two sealing ring assemblies (e.g., which may be less than pressure in gas region 1170). Accordingly, a sealing ring assembly may be used to seal any suitable high pressure and low-pressure regions from each other.

In some embodiments, free piston assemblies 1110 and 1120 may include respective magnet sections 1151 and 1156, which interact with respective stators 1152 and 1157 to form respective linear electromagnetic machines 1150 and 1155. For example, as free piston assembly 1110 translates along axis 1172 (e.g., during a stroke of an engine cycle), magnet section 1151 may induce current in windings of stator 1152. Further, current may be supplied to respective phase windings of stator 1152 to generate an electromagnetic force on free piston assembly 1110 (e.g., to effect motion of free piston assembly 1110).

In some embodiments, pistons 1114 and 1124, sealing ring assemblies 1112 and 1122, and cylinder 1130 may be considered a piston and cylinder assembly. In some embodiments, device 1100 may be an engine, an air compressor, any other suitable device having a piston and cylinder assembly, or any combination thereof. In some embodiments, device 1100 need not include two free piston assemblies. For example, cylinder 1130 could be closed (e.g., with a cylinder head), and free piston assembly 1110 alone may translate along axis 1172.

It will be understood that the present disclosure is not limited to the embodiments described herein and can be implemented in the context of any suitable system. In some suitable embodiments, the present disclosure is applicable to reciprocating engines and compressors. In some embodiments, the present disclosure is applicable to free-piston engines and compressors. In some embodiments, the present disclosure is applicable to combustion and reaction devices such as a reciprocating engine and a free-piston engine. In some embodiments, the present disclosure is applicable to non-combustion and non-reaction devices such as reciprocating compressors, free-piston heat engines, and free-piston compressors. In some embodiments, the present disclosure is applicable to gas springs. In some embodiments, the present disclosure is applicable to oil-free reciprocating and free-piston engines and compressors.

In some embodiments, the present disclosure is applicable to oil-free free-piston engines with internal or external combustion or reactions. In some embodiments, the present disclosure is applicable to oil-free free-piston engines that operate with compression ignition, chemical ignition (e.g., exposure to a catalytic surface, hypergolic ignition), plasma ignition (e.g., spark ignition), thermal ignition, any other suitable energy source for ignition, or any combination thereof. In some embodiments, the present disclosure is applicable to oil-free free-piston engines that operate with gaseous fuels, liquid fuels, or both. In some embodiments, the present disclosure is applicable to linear free-piston engines. In some embodiments, the present disclosure is applicable to engines that can be combustion engines with internal combustion/reaction or any type of heat engine with external heat addition (e.g., from a heat source such as waste heat or an external reaction such as combustion).

The foregoing is merely illustrative of the principles of this disclosure, and various modifications may be made by those skilled in the art without departing from the scope of this disclosure. The above described embodiments are presented for purposes of illustration and not of limitation. The present disclosure also can take many forms other than those explicitly described herein. Accordingly, it is emphasized that this disclosure is not limited to the explicitly disclosed methods, systems, and apparatuses, but is intended to include variations to and modifications thereof, which are within the spirit of the following claims.

What is claimed is:

1. A sealing ring assembly comprising:
   at least one ring segment of a first tensile strength; and
   at least one metal reinforcement layer bonded to the at least one ring segment along an interface, wherein:
      shear forces between the at least one ring segment and the at least one metal reinforcement layer are transmitted, and
      based on being bonded, the at least one metal reinforcement layer provides a compressive preload onto the at least one ring segment along the interface causing the sealing ring assembly to be of a second tensile strength greater than the first tensile strength, wherein the at least one metal reinforcement layer exerts a radially inward force on the at least one ring segment at the interface.

2. The sealing ring assembly of claim 1, wherein the interface is a brazed interface.

3. The sealing ring assembly of claim 1, wherein at least one of the at least one ring segment comprises a self-lubricating material.

4. The sealing ring assembly of claim 1, wherein at least one of the at least one ring segment comprises graphite.

5. The sealing ring assembly of claim 1, wherein the sealing ring assembly is configured for oil-less operation.

6. The sealing ring assembly of claim 1, wherein:
   the at least one ring segment has a corresponding first coefficient of thermal expansion (CTE);
   the at least one metal reinforcement layer has a corresponding second CTE; and
   the first CTE and the second CTE are matched to each other.

7. The sealing ring assembly of claim 1, wherein the at least one metal reinforcement layer comprises at least one metal sheet.

8. The sealing ring assembly of claim 1, wherein the at least one metal reinforcement layer is bonded along a portion of the at least one ring segment.

9. The sealing ring assembly of claim 1, wherein the at least one metal reinforcement layer is bonded along an inner radial surface of the at least one ring segment.

10. The sealing ring assembly of claim 1, wherein as the at least one ring segment wears during operation, the at least one ring segment remains in compression, and the at least one metal reinforcement layer remains in tension for at least some time during operation.

11. A device comprising:
a cylinder comprising a bore, wherein the bore comprises a low-pressure region and a high-pressure region;
a piston comprising a ring groove, wherein the piston is configured to translate along an axis of the bore; and
a sealing ring assembly arranged in the ring groove, the sealing ring assembly comprising:
at least one ring segment of a first tensile strength configured to seal between the low-pressure region and the high-pressure region; and
at least one metal reinforcement layer bonded to the at least one ring segment along an interface, wherein:
shear forces between the at least one ring segment and the at least one metal reinforcement layer are transmitted, and
based on being bonded, the at least one metal reinforcement layer provides a compressive preload onto the at least one ring segment along the interface causing the sealing ring assembly to be of a second tensile strength greater than the first tensile strength, wherein the at least one metal reinforcement layer exerts a radially inward force on the at least one ring segment at the interface.

12. The device of claim 11, wherein the sealing ring assembly is configured for oil-less operation in the bore.

13. The device of claim 11, wherein at least one of the at least one ring segment comprises a self-lubricating material.

14. The device of claim 11, wherein the at last one metal reinforcement layer is bonded along a portion of the at least one ring segment.

15. The device of claim 11, wherein the at least one metal reinforcement layer is bonded along an inner radial surface of the at least one ring segment.

16. The device of claim 11, wherein as the at least one ring segment wears during operation, the at least one ring segment remains in compression and the at least one metal reinforcement layer remains in tension for at least some time during operation.

17. A sealing ring assembly comprising:
at least one ring segment of a first tensile strength, comprising a first end and a second end; and
at least one wire reinforcement engaged with the at least one ring segment at the first end and at the second end, such that:
the at least one ring segment is in compression and the at least one wire reinforcement is in tension along the at least one wire reinforcement between the first end and the second end, wherein the at least one wire reinforcement exerts a radially inward force on the at least one ring segment, and
the sealing ring assembly is of a second tensile strength greater than the first tensile strength.

18. The sealing ring assembly of claim 17, wherein the at least one wire reinforcement comprises metal.

19. The sealing ring assembly of claim 17, wherein the at least one wire reinforcement is engaged to the at least one ring segment along an interface.

20. The sealing ring assembly of claim 17, wherein the at least one wire reinforcement is engaged to the at least one ring segment using a tensioning termination.

21. The sealing ring assembly of claim 20, wherein:
the at least one wire reinforcement comprises at least one threaded end corresponding to at least one of the first end and the second end,
the tensioning termination comprises a thread corresponding to the threaded end; and
the tensioning termination is threaded onto the threaded end to cause the at least one wire reinforcement to be engaged with the at least one ring segment at the first end and at the second end.

22. The sealing ring assembly of claim 21, wherein the tensioning termination is torqued onto the threaded end causing the at least one wire reinforcement to be in tension.

23. The sealing ring assembly of claim 17, wherein the at least one wire reinforcement azimuthally extends through the at least one ring segment.

24. The sealing ring assembly of claim 17, wherein at least one of the at least one ring segment comprises a self-lubricating material.

25. The sealing ring assembly of claim 17, wherein at least one of the at least one ring segment comprises graphite.

26. A device comprising:
a cylinder comprising a bore, wherein the bore comprises a low-pressure region and a high-pressure region;
a piston comprising a ring groove, wherein the piston is configured to translate along an axis of the bore; and
a sealing ring assembly arranged in the ring groove, the sealing ring assembly comprising:
at least one ring segment of a first tensile strength configured to seal between the low-pressure region and the high-pressure region, wherein the at least one ring segment comprises a first end and a second end; and
at least one wire reinforcement engaged with the at least one ring segment at the first end and at the second end, such that:
the at least one ring segment is in compression and the at least one wire reinforcement to be in tension along the at least one wire reinforcement between the first end and the second end, wherein the at least one wire reinforcement exerts a radially inward force on the at least one ring segment, and
the sealing ring assembly is of a second tensile strength greater than the first tensile strength.

27. The device of claim 26, wherein the sealing ring assembly is configured for oil-less operation in the bore.

28. The device of claim 26, wherein the at least one wire reinforcement azimuthally extends through the at least one ring segment.

29. The device of claim 26, wherein at least one of the at least one ring segment comprises a self-lubricating material.

30. The device of claim 26, wherein at least one of the at least one ring segment comprises graphite.

* * * * *